US009117195B2

(12) United States Patent
Casey

(10) Patent No.: US 9,117,195 B2
(45) Date of Patent: Aug. 25, 2015

(54) SYNCHRONIZED CONSUMPTION MODES FOR E-BOOKS

(75) Inventor: Matthew R. Casey, San Francisco, CA (US)

(73) Assignee: Google Inc., Mountain View, CA (US)

( * ) Notice: Subject to any disclaimer, the term of this patent is extended or adjusted under 35 U.S.C. 154(b) by 704 days.

(21) Appl. No.: 13/372,336

(22) Filed: Feb. 13, 2012

(65) Prior Publication Data
US 2013/0212454 A1 Aug. 15, 2013

(51) Int. Cl.
*G06F 17/30* (2006.01)
*G06Q 10/10* (2012.01)

(52) U.S. Cl.
CPC ............... *G06Q 10/10* (2013.01); *G06F 17/30* (2013.01); *G06Q 2220/10* (2013.01)

(58) Field of Classification Search
CPC ........................................................ G06F 17/30
USPC ............................................................ 715/203
See application file for complete search history.

(56) References Cited

U.S. PATENT DOCUMENTS

| 6,404,978 | B1 * | 6/2002 | Abe .............................. 386/281 |
| 7,689,578 | B2 * | 3/2010 | Albornoz et al. ............. 715/230 |
| 2003/0115289 | A1 | 6/2003 | Chinn et al. |
| 2005/0080633 | A1 | 4/2005 | Lueck et al. |
| 2011/0231474 | A1 | 9/2011 | Locker et al. |

FOREIGN PATENT DOCUMENTS

| JP | 2005-189906 A | 7/2005 |
| KR | 10-2005-0106246 A | 11/2005 |
| KR | 10-0678028 B1 | 2/2007 |

OTHER PUBLICATIONS

PCT International Search and Written Opinion, PCT/US2013/023688, May 15, 2013, 8 Pages.

* cited by examiner

*Primary Examiner* — Kavita Padmanabhan
*Assistant Examiner* — Tionna Burke
(74) *Attorney, Agent, or Firm* — Fenwick & West LLP

(57) ABSTRACT

An e-book system receives and stores different versions of an e-book supporting different consumption modes. Additionally, the e-book system stores signposts for the e-book. The signposts include corresponding locations in different versions of the e-book. When a user switches from a first version to a second version, the e-book system determines based on the signposts a location in the second version of the e-book that corresponds to the current location in the first version. The e-book system then presents the content in the second version from the determined location.

21 Claims, 6 Drawing Sheets

SYNCHRONIZED CONSUMPTION MODES FOR E-BOOKS

BACKGROUND

1. Field of Disclosure

The disclosure generally relates to the consumption of electronic content such as electronic books, and in particular to synchronized switching among different modes of consumption of the electronic content.

2. Background Information

Electronic books ("e-books") are growing increasingly popular. One benefit of e-books is that they are easily transportable and can be accessed at a variety of locations. For example, a single e-book reader device ("e-reader) can carry many e-books. Thus, a user of the e-reader can carry the e-reader device on his or her person and use the device to read the e-books whenever time permits. Moreover, e-books can be accessed and synchronized using a variety of cloud services. A user can use a dedicated e-reader to read e-books while at home, and use a different e-reader device, such as a mobile telephone, to read the same e-books while on the road.

Oftentimes, e-books are available for consumption in a variety of different modes. For example, an e-book may be available in a traditional text-based version for consumption by reading, and also available in an audio book version for consumption by listening. The audio book version may be narrated by a human actor or other voiceover professional that reads the text with added nuance such as tone or inflection that enhances the enjoyment of the listener.

A user may desire to occasionally switch among the various consumption modes for an e-book. The user may read the text version of the e-book when relaxing at home, but desire to listen to the audio version of the e-book at other times, such as when the user is driving. However, switching among the consumption modes is difficult because the different versions of the e-book are independent. There is no easy way for the user to maintain the same reading/listening position between the text and audio versions of an e-book. Thus, the user must manually locate the correct position when switching consumption modes. This extra effort is time-consuming and detracts from the user's overall enjoyment of the e-book.

One potential solution that addresses the problem described above is to use the e-reader to perform text-to-speech conversion of the text version of the e-book. Here, the e-reader dynamically converts the text of the e-book to spoken words. However, current text-to-speech systems use mechanical-sounding voices that lack the nuance provided in audio e-books by a human narrator. Accordingly, user experience when listening to a text-to-speech conversion of a text e-book does not match that of listening to an audio version of an e-book created with a human narrator.

SUMMARY

The above-described and other issues are addressed by a computer-implemented method, computer-readable medium, and computer system for switching between synchronized consumption modes of an e-book. Embodiments of the method include storing a first version and a second version of the e-book, the first version supporting a first consumption mode of the e-book and the second version supporting a second consumption mode of the e-book. Moreover, the method includes storing signposts associated with the first and second versions of the e-book, the signposts including corresponding locations within the first and the second versions of the e-book. Additional steps for the method include receiving a current location in the first version of the e-book, determining a current location in the second version of the e-book based on the stored signposts and the received current location in the first version of the e-book, and transmitting for presentation the current location in the second version of the e-book.

Embodiments of the computer readable medium store instructions for performing the method for switching between synchronized consumption modes of an e-book. Embodiments of the performed method includes storing a first version and a second version of the e-book, the first version supporting a first consumption mode of the e-book and the second version supporting a second consumption mode of the e-book. Moreover, the method includes storing signposts associated with the first and second versions of the e-book, the signposts including corresponding locations within the first and the second versions of the e-book. Additional steps for the method include receiving a current location in the first version of the e-book, determining a current location in the second version of the e-book based on the stored signposts and the received current location in the first version of the e-book, and transmitting for presentation the current location in the second version of the e-book.

Embodiments of the computer system comprise a computer readable medium that stores instructions for performing the method for switching between synchronized consumption modes of an e-book. Embodiments of the performed method includes storing a first version and a second version of the e-book, the first version supporting a first consumption mode of the e-book and the second version supporting a second consumption mode of the e-book. Moreover, the method includes storing signposts associated with the first and second versions of the e-book, the signposts including corresponding locations within the first and the second versions of the e-book. Additional steps for the method include receiving a current location in the first version of the e-book, determining a current location in the second version of the e-book based on the stored signposts and the received current location in the first version of the e-book, and transmitting for presentation the current location in the second version of the e-book.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The computing environment described herein enables switching among synchronized consumption modes for an e-book. The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
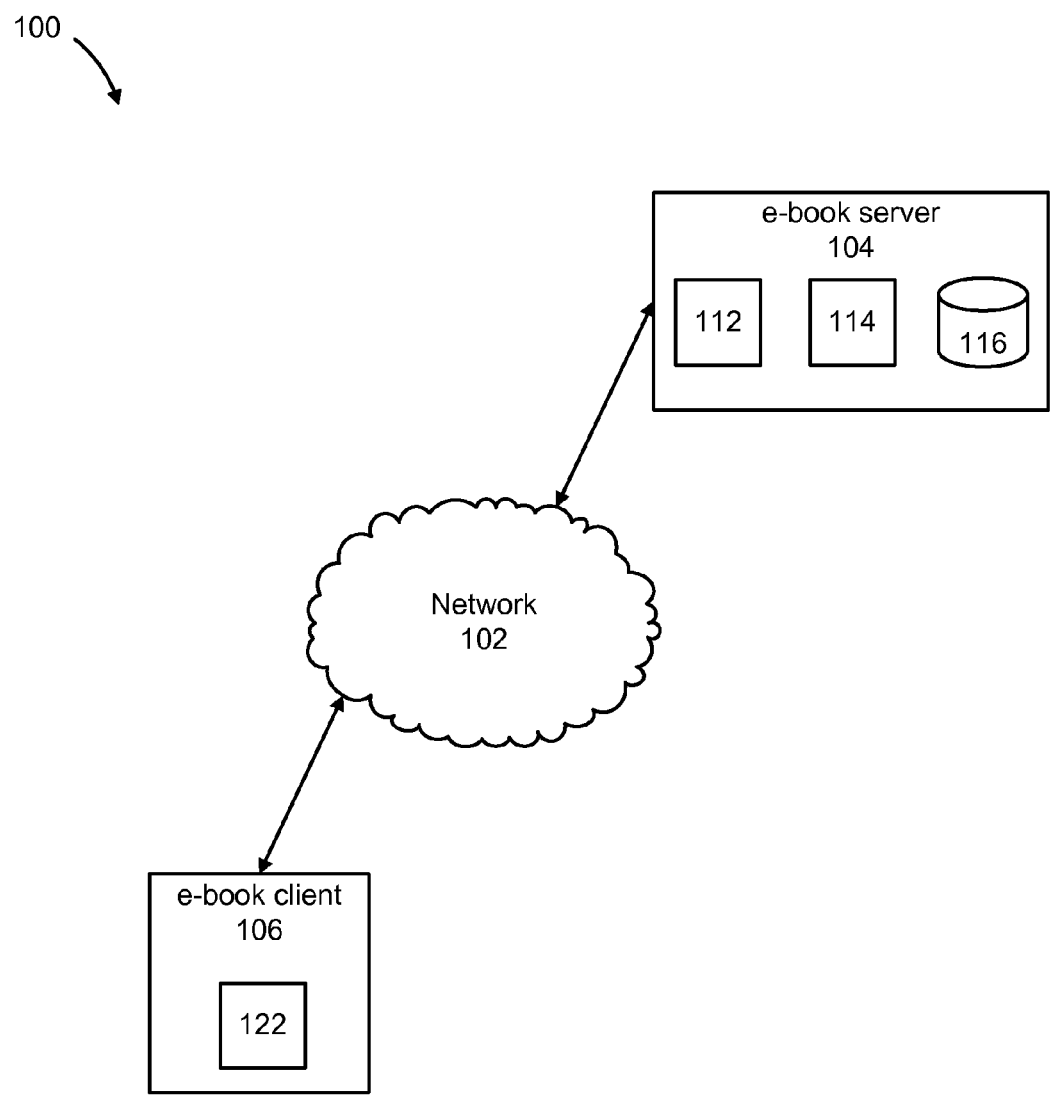
FIG. 1 is a block diagram illustrating a computing environment for switching between synchronized consumption modes of an e-book according to one embodiment.

FIG. 1 illustrates the computing environment 100 for switching among synchronized consumption modes of an e-book. The environment 100 includes an e-book server 104 and an e-book client 106 communicatively coupled to each other through a network 102. Although only one e-book server 104 and e-book client 106 are illustrated, the computing environment may include multiple instances of each entity. Moreover, some of the functions ascribed to the e-book server 104 may be performed by the e-book client 106 and vice versa. Other entities may also be coupled to the network 102.

The e-book server 104 is a computing device with a processor and a memory that communicates with the e-book client 106 via the network 102 to facilitate switching among synchronized consumption modes for e-books. Depending upon the embodiment, the e-book server 104 may be operated by a retailer that sells or otherwise provides e-books to users of e-book clients 106, or may be operated by a third party that provides services for e-books obtained by the users from different sources. Moreover, the e-book server 104 may be implemented as cloud-based service distributed across multiple physical servers.

In the illustrated embodiment, the e-book server 104 includes a content processing module 112, a synchronization module 114 and a storage module 116. The storage module 116 stores versions of e-books supporting consumption in multiple modes. An e-book includes electronic content that can be consumed by a user. The content of an e-book may be, for example, a novel, a textbook, or a reference book. As used herein, the term "e-book" also includes other electronic content such as magazines, journals, newspapers, or other publications.

In one embodiment, the consumption modes supported by the e-book server 104 include a reading mode and a listening mode. Thus, the storage module 116 stores a version of an e-book in a text format for supporting the reading mode, and a version of the same e-book in an audio format for supporting the listening mode. Other embodiments of the e-book server 104 may support different or additional consumption modes, such as a movie mode that includes e-book content in audio format (e.g. narration and/or dialogue in the movie), and therefore may also store additional versions of the e-book. The storage module 116 may receive the versions of the e-book from publishers of the e-books, from the e-book clients 106, or from other sources. Additionally, the storage module 116 stores synchronization data produced and used by the other modules of the e-book server 104 to synchronize consumption of e-books in the different modes.

The content processing module 112 processes the various versions of the e-books to create synchronization data useful for synchronizing consumption of e-books in different modes. In one embodiment, the content processing module 112 processes the different versions of an e-book to produce signpost data, or signposts, that specify corresponding locations within the different e-book versions. For example, the signpost data can include a signpost indicating that a particular location within the text version of the e-book corresponds to a particular location within the audio version of the e-book.

The synchronization module 114 uses the synchronization data to support synchronization of different consumption modes of the e-books. In one embodiment, the synchronization module 114 communicates with the e-book clients 106 to receive a user's current location in a first consumption mode of an e-book (e.g., the user's current reading location in the text version of the e-book). The synchronization module 114 uses this current location and the stored signposts to determine one or more corresponding locations in the versions of the e-book supporting other consumption modes (e.g., the corresponding location in the audio version of the e-book). The synchronization module 114 provides these corresponding locations to the e-book clients 106 to allow the users of the clients to switch among the various consumption modes while maintaining synchronized locations within the content. Thus, a user may switch between text and audio versions of an e-book while maintaining the user's current position in the content with each switch.

The e-book client 106 is a computing device with a processor and a memory used by one or more users to consume e-book content. The e-book client 106 may be, for example, a mobile phone, desktop, laptop, or tablet computer, or a dedicated e-book consumption device. The client 106 may execute one or more applications that support consumption of e-books in various different modes.

The e-book client includes one or more content modules 122 for presenting the e-book content. In one embodiment, the e-book client 106 includes separate content modules 122 for presenting the e-book content for consumption in different modes. In another embodiment, the same content module 122 presents the e-book content for consumption in multiple consumption modes.

Assuming for purposes of discussion that a single content module 122 supports multiple consumption modes, the content module communicates with the e-book server 104 to receive synchronization data. The content module 122 uses these data to synchronize the presentation of the e-book content in the various modes, thereby allowing the user to consume the content in a synchronized manner. To this end, the content module 122 may receive a command from the user to switch from a first consumption mode to a second consumption mode. In response, the content module 122 determines the current location in the first consumption mode and determines the corresponding location in the second consumption mode based on the received synchronization data. The content module 122 then presents the content at the corresponding location to the user using the second consumption mode. Because the same content module 122 presents the content in the first and the second consumption mode, the content module 122 alone (without the help of the e-book server 104) can track a user's current location in the consumption modes used by the user.

In some embodiments, the user may use different e-book clients 106 to consume the content in the different modes. For example, the user may use a dedicated e-book reader to consume text content, and use a mobile telephone, music player, or other device to consume audio content. In these embodiments, the e-book clients 106 provide current location information to the e-book server 104. When the user switches from a first to a second consumption mode, the e-book client 106 supporting the second consumption mode receives the current location in the version of the e-book corresponding to the second consumption mode from the e-book server 104. Thus, the user can seamlessly switch between synchronized consumption modes even though the user uses multiple e-book clients 106.

The network 102 represents the communication pathways between the e-book client 106 and the e-book server 104. In one embodiment, the network 102 is the Internet. The network 102 can also use dedicated or private communications links that are not necessarily part of the Internet.

Content Processing Module

Figure 2:
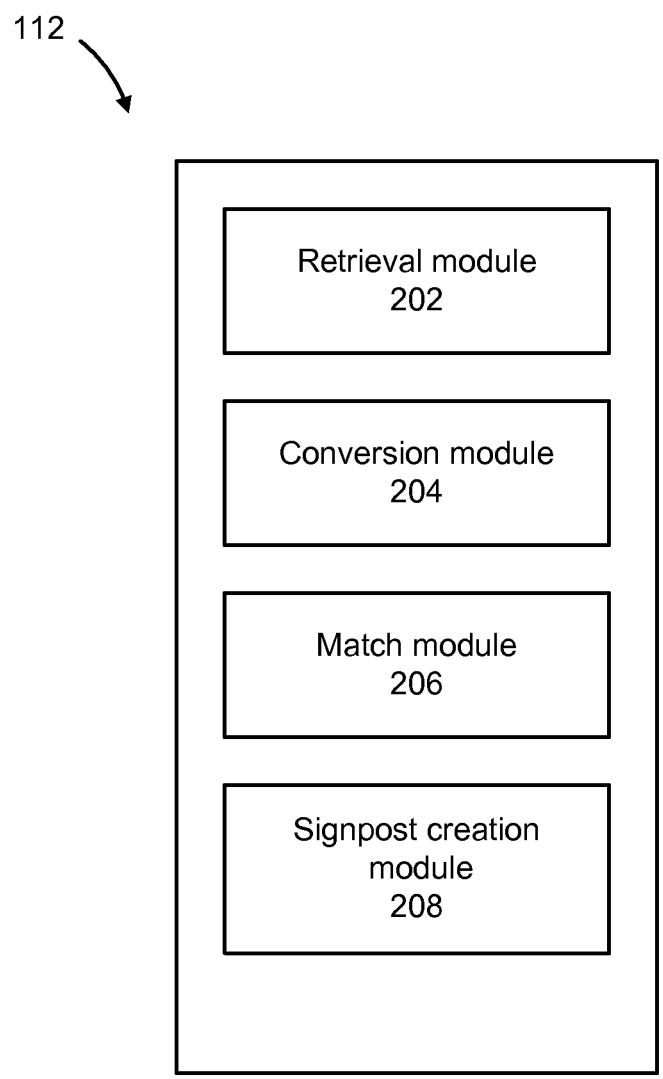
FIG. 2 is a block diagram illustrating a content processing module configured to create signposts that facilitate switching between synchronized consumption modes of an e-book according to one embodiment.

FIG. 2 is a block diagram illustrating a content processing module configured to create signposts that facilitate switching between synchronized consumption modes of an e-book according to one embodiment. The content processing module 112 includes a retrieval module 202, a conversion module 204, a match module 206 and a signpost creation module 208. In some embodiments, the functions are distributed among the modules in a different manner than described herein. Moreover, the functions are performed by other entities in some embodiments.

The retrieval module 202 retrieves the versions of the e-book corresponding to the different consumption modes for content processing. In one embodiment, the retrieval module 202 retrieves the e-book versions from the storage module 116. Thus, for a given e-book being processed to create synchronization data, the retrieval module 202 identifies the versions of the e-book corresponding to the different consumption modes, and retrieves these versions from the storage module 116. For example, the retrieval module 202 may retrieve text and audio versions of an e-book from the storage module 116. In one embodiment, the retrieval module 202 identifies different versions of an e-book based on the names or the storage location of different versions. For example, an audio version of the e-book titled "1984" may be named "1984_Audio" and text version "1984_Text."

The conversion module 204 converts a version of an e-book into a format suitable for comparison with one or more other versions of the e-book. In one embodiment where there are audio (or video) and text version of the e-book, the conversion module 204 converts the audio content from audio version or video version to text using speech recognition techniques such as continuous speech recognition. As part of this conversion, the conversion module 204 generates confidence scores for snippets of converted text indicating the likelihood that the snippet was correctly converted from audio to text. A snippet may range from a single word to a larger set of words, such as 2-3 words, a sentence, or a paragraph, depending on the embodiment. For example, the conversion module 204 may apply a technique like hidden Markov model to provide a score between 0 and 1 indicating the likelihood that a snippet of text was correctly converted from the corresponding audio. The conversion module 204 stores the converted text snippets with the corresponding confidence scores in the storage module 116.

The conversion module 204 also stores timing information with the converted text snippets. The timing information indicates the locations within the audio corresponding to the text snippets. Thus, the timing information serves as an index to locations within the audio version, or the video version, of the e-book corresponding to the text snippets.

The match module 206 compares the converted e-book and/or unconverted versions of an e-book to identify matching parts. In one embodiment, the match module 206 compares the converted audio e-book (i.e., the text snippets produced through speech recognition) with the text version of the same e-book in order to identify matching text. That is, the match module 206 identifies locations in the text version of the e-book in which the text snippets produced by the conversion module 204 are found. In one embodiment, the match module 206 employs fuzzy matching for the comparison to account for minor differences between the compared versions of the e-book. For example, the text snippets produced by the conversion module 204 may lack punctuation found in corresponding portions of the text version of the e-book. The fuzzy matching beneficially accounts for lack of punctuation and other differences (for e.g. differences caused by faulty audio-to-text conversion of parts of audio e-book).

The match module 206 creates a match index identifying the locations of the matching portions of the compared versions of the e-book. In one embodiment, upon finding a match between a converted text snippet and a part of the text version of the e-book, the match module 206 stores an entry in the match index that associates the location of the matching part of the text version of the e-book with the timing information indicating the location of the matching snippet in the audio version of the e-book. For example, the stored match index may include an entry indicating that line 4 on page 6 in the text version of the e-book matches with timestamps 13:02-13:06 in the audio version of the e-book.

In one embodiment, the match module 206 does not include in match index entries that have one-to-many correspondence between two versions of the e-book. For example, if a converted text snippet matches text in more than one location of the text version, the match module 206 does not include an entry in the match index for these matches. In another embodiment, the match module 206 identifies matches in a sequential order, i.e. a converted text snippet with an earlier location (indicated by its timing information) is matched before a text snippet with a later location. In this embodiment, the match module 206 resolves the one-to-many correspondence based on the matched locations in the previous match index entries. For example, if a converted text matches with two text locations in the text version, the match module 206 selects the text location that is closer to the text location in the preceding match entry. Accordingly, the match module 206 selects a matched location on page 6 instead of a matched location on page 10 if the previous match entry includes a location on page 4.

In one embodiment, the match module 206 does not match all the converted text snippets. Instead, the match module 206 identifies the converted text snippets with a high confidence score, like 0.9 on a scale of 0 to 1, and matches these identified text snippets with content in the text version. Accordingly, the match module 206, in this embodiment, stores in the match index the locations in the text e-book and the timestamps of the matched audio frames that have been converted with a high confidence score.

The signpost creation module 208 selects and stores entries from the match index as signposts that include information for facilitating determination of corresponding locations in the different versions of an e-book. In one embodiment, the signpost creation module 208 uses the conversion confidence scores as a factor in the signpost selection. Thus, the signpost creation module 208 may select as signposts the match index entries that reference text snippets having confidence scores indicating a high degree of confidence that the snippets were converted correctly. In another embodiment, the match index only includes entries for snippets converted with high confidence scores and the signpost creation module 208 selects as signposts all entries in the match index.

The signpost creation module 208 indexes the signposts to allow retrieval of signposts with consecutive locations, i.e. a module retrieving two consecutive signposts can ensure that another signpost with a location between the locations specified in the two signposts does not exist. Because a signpost includes corresponding locations in different versions of the e-book, two signposts with consecutive locations in one version, e.g. the audio version, would also include consecutive locations in the other versions, e.g. text version.

In one embodiment, the signpost creation module 208 transmits the selected signposts to a human reviewer for manual verification or feedback. The signpost creation module 208 may transmit signposts for only certain e-books, such as popular e-books, for manual verification. To verify the signposts, the signpost creation module 208 determines matching content in the audio and the text e-book versions based on the created signposts. The signpost creation module 208 then transmits the determined content for presentation to a human reviewer. In one embodiment, the signpost creation module 208 also transmits content surrounding the determined audio and text content. The reviewer then provides feedback regarding the signposts by affirming, rejecting or proposing edits to the signposts based on the presented matches. For example, the reviewer may indicate that the audio content matches the determined text content, but the audio content also includes two words preceding the determined text content. In another example, the reviewer may indicate that the transmitted content does not match and therefore the signpost associated with the transmitted content is a false positive. The signpost creation module 208 receives the reviewer's feedback and modifies the signposts based on the received feedback.

In one embodiment, the signpost creation module 208 determines that the created signposts for an e-book are too sparse. The signpost creation module 208 determines that the created signposts are too sparse based on the distance between consecutive signposts. For example, the signpost creation module 208 determines that the locations for audio version in two consecutive signposts are separated by a distance beyond a threshold like two minutes, or the locations in the text version indicated in two consecutive signposts are separated by a distance beyond a threshold like three pages. Alternatively, the signpost creation module 208 determines that the created signposts are too sparse based on the total number of signposts for an e-book. For example, the signpost creation module 208 determines that the signposts are too sparse if the number of signposts for an e-book is below a threshold. In this embodiment, the signpost creation module 208 transmits for presentation to the reviewer the content from different versions of the e-book located between two signposts. The reviewer then selects the matching locations between the presented versions, and the signpost creation module 208 receives and stores the selected locations as additional signposts. In one embodiment, the signpost creation module 208 presents the content from different versions and receives and stores the matching locations as additional signposts regardless of whether the existing signposts are too sparse or not. In this manner, the signpost creation module 208 beneficially stores manually verified signposts that are more accurate than unverified signposts.

Figure 3:
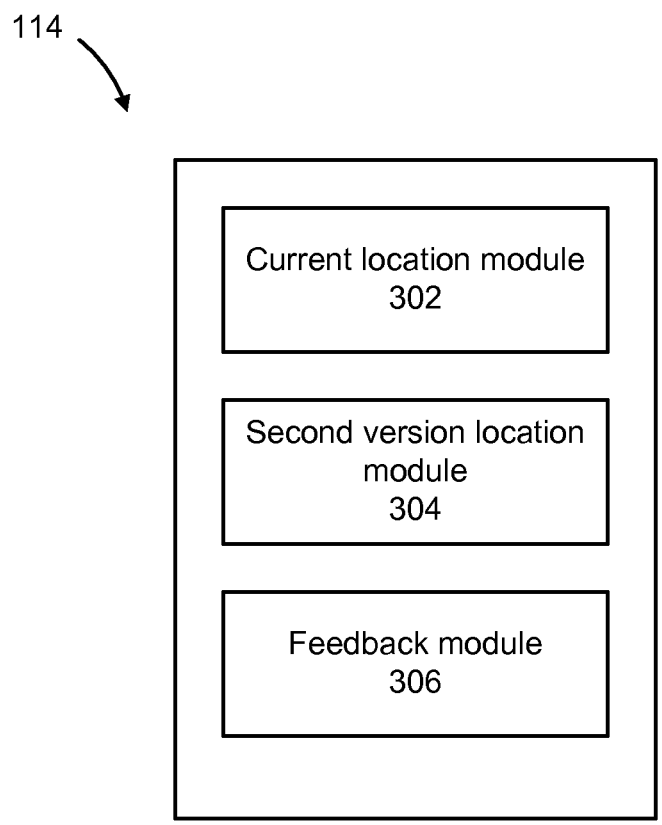
FIG. 3 is a block diagram illustrating a synchronization module configured to switch between synchronized consumption modes of an e-book according to one embodiment.

FIG. 3 is a block diagram illustrating a synchronization module 114 configured to switch between synchronized consumption modes of an e-book according to one embodiment. The synchronization module 114 comprises a current location module 302, a second version location module 304 and a feedback module 306.

The current location module 302 repeatedly receives, from the content module 122, and stores the user's current location in a first version of an e-book supporting a first consumption mode. In one embodiment, the current location module 302 receives the current location "heartbeat", i.e. an update message periodically received after a pre-determined time interval. In another embodiment, the current location module 302 receives the current location after the user has accessed content whose location is indicated by a signpost. In one embodiment, the current location module 302 also receives the first consumption mode (e.g. reading, listening, or watching) supported by the first version. In another embodiment, the current location format itself indicates the consumption mode to the current location module 302. For example, if the received current location is page 8 paragraph 1, the current location module 302 infers that the consumption mode is reading.

The repeatedly updated current location beneficially enables the second version location module 304 to determine the current location in a second e-book version supporting a second consumption mode when the user switches to the second version. After the user switches to the second version, the second version location module 304 receives a request for the current location in the second version from the content module 122 presenting the second version. The second version location module 304 receives the request and determines the signpost corresponding to the current location in the first version.

In one embodiment, the second version location module 304 determines the signpost including a location closest to and before the current location in the first version. For example, if the user is on page 5 of the text e-book and the two closest signposts include locations on page 3 and page 6 of the text e-book, the second version location module 304 selects the signpost including location on page 3 even though page 6, and not page 3, is closer to page 5. In another embodiment, the second version location module 304 selects the signpost including the closest location regardless of whether the location in the signpost is before or after the current location. Accordingly, in this embodiment, the second version location module 304 selects the signpost including location on page 6. After determining the appropriate signpost, the second version location module 304 determines the current location in the second version, hereinafter "the second version location," from the determined signpost.

In one embodiment, the determined second version location is the location indicated in the determined signpost. In another embodiment, the second version location module 304 infers the second version location based on the determined signpost, the current location in the first version and the empirical data indicating consumption rates for a typical user for consuming the e-book content in different consumption modes. For example, assume that the empirical data suggests that a typical audio performance for a page in the text version takes two minutes. Additionally, assume that the user's current location in the text version is page 12 and the determined signpost includes text location of page 10 and corresponding audio location of twenty one minutes. In one embodiment, the empirical data is analyzed by the feedback module 306 and the feedback module 306 provides these assumptions to the second version location module 304 for adjusting the inferred second version location. Based on these assumptions from the empirical data, the second version location module 304 adjusts the inferred second version location to twenty five minutes (twenty one minutes corresponding to page 10 and additional four minutes for the two additional pages after page 10). In another embodiment, the second version location module 304 infers the second version location only if the first version's current location specified in the determined signpost and the received current location are separated by a threshold distance. Examples of such threshold distance are two pages for text e-book and four minutes for audio e-book.

In one embodiment, the second version location module 304 infers conservatively to ensure that the inferred second version location corresponds to a location—at or before the current location in the first version. For example, after inferring the second version location as mentioned above, the second version location module 304 adjusts the inferred second version location by a pre-determined amount. For example, the second version location module 304 adjusts the inferred second version location and recommends a second version location that is twelve lines or thirty seconds before the inferred second version location. This adjustment beneficially ensures that the content module 122 for presenting the second version does not present content that is ahead of the content presented to the user in the first version.

In one embodiment, the second version location module 304 makes the conservative inference based on additional assumptions provided by the feedback module 306. For example if the empirical data suggests that recommending a second version location that is twelve lines or thirty seconds behind the inferred location is more than 99.99% successful and recommending a second version location that is three lines or seven second behind is 92% successful, the second version location module 304 adjusts the inferred second version location by twelve lines or thirty seconds instead of three lines or seven seconds. After the second version location module 304 determines, and optionally adjusts, the second version location, the second version location module 304 transmits for presentation the determined location to the content module 122. The content module 122 receives the second version location and presents the content from the received location.

The feedback module 306 receives and stores empirical data from the content module 122 regarding a user's activity associated with the presented content. For example, the feedback module 306 receives from the content module 122 the amount of time spent by a user in reading a section of the text e-book. Additionally, in one embodiment, the feedback module 306 receives the number of words, lines, paragraphs, or pages in the read section. The feedback module 306 analyzes this feedback regarding various users and determines the amount of time spent by a typical user in reading a particular number of words, lines, paragraphs, or pages. The feedback module 306 provides the determined rate of reading for a typical user as an assumption to the second version location module 304, and the second version location module 304 uses the determined reading rate to infer a second version location as described above.

Additionally, the feedback module 306 receives from the content module 122 the amount of adjustment made by a user after the content module 122 presents content from the received current location in the second version. For example, after the content is presented from a determined second version location, if a user moves the cursor to a different page or a different audio location, the content module 122 infers the new location as the correct second version location. The content module 122 transmits this new location to the feedback module 122. Based on the determined second version location and the received actual location, the feedback module 306 determines the delta between the determined and the actual location. Additionally, the feedback module 306 determines the direction of the delta, i.e. the feedback module 306 determines whether the determined second version location was before or after the actual current location. The feedback module 306 determines and stores the delta and the delta direction for various users and determines a delta and a delta direction for a typical user.

In one embodiment, the feedback module 306 also determines and stores a delta and a delta direction that provides a success rate of inferring a current location beyond a threshold, for example beyond 99.99%. For example, based on the stored deltas and delta directions, the feedback module 306 determines that 99.99% of the times, the user do not move the cursor behind the received location by more than twelve lines or thirty seconds. The feedback module 306 therefore infers that an adjustment of the determined second version location by twelve lines or thirty seconds in the backward direction will ensure 99.99% of the times that the user starts at or before the current location in the first version. The stored delta and delta direction are used by the second version location module 304 to infer a second version location as described above.

Figure 4:
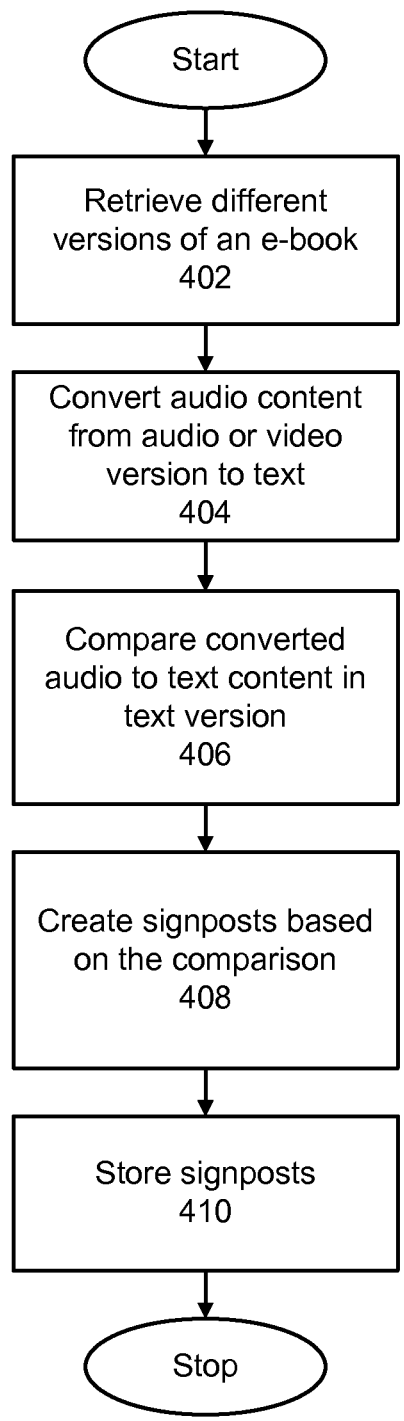
FIG. 4 is a flow diagram illustrating a method for creating and storing signposts that facilitate switching between synchronized consumption modes of an e-book according to one embodiment.

FIG. 4 is a flow diagram illustrating a method for creating and storing signposts that facilitate switching between synchronized consumption modes of an e-book according to one embodiment. In step 402, the e-book server 104 retrieves the different versions of an e-book and converts, in step 404, the audio content from the audio (or the video) e-book into text. In step 406, the e-book server 104 compares the converted text to the text content from the text e-book, and in steps 408-410 creates and stores signposts based on the comparison. The created signposts include audio or video locations in the audio (or the video) e-book and their matching locations in the text e-book. These created signposts facilitate determination of corresponding locations in the audio (or the video) version and the text version when the user switches from one version to another.

Figure 5:
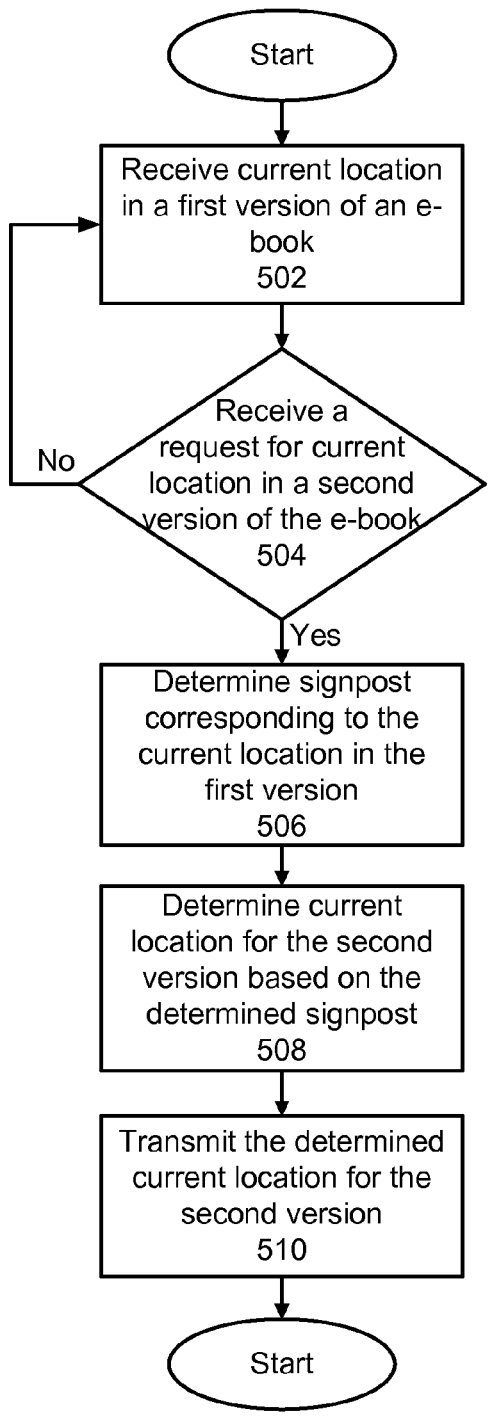
FIG. 5 is a flow diagram illustrating a method for determining a current location in a second consumption mode after a user switches from a first to the second consumption mode of an e-book according to one embodiment.

FIG. 5 is a flow diagram illustrating a method for determining a current location in a second consumption mode after a user switches from a first to the second consumption mode of an e-book according to one embodiment. In step 502, the e-book server 104 repeatedly receives a current location from a first content module 122 as the first content module 122 presents content from a first version supporting a first consumption mode of the e-book. For illustrations purposes, the first version is hereinafter assumed to be the audio version and the second version is assumed to be the text version. One of ordinary skill in the art would understand that the e-book server 104 would work in a similar manner if the first version is the text version and the second version is the audio or the video version.

At some point, the user switches to the second version supporting a second consumption mode, i.e. the text version, and the second content module 122 transmits a request for the current location in the text version. In step 504, the e-book server 104 receives the request and determines, in step 506, a signpost corresponding to the latest received current location from the first content module 122. Next, the e-book server 104 determines, in step 508, a current location in the text version based on the determined signpost and, in step 510, transmits the determined location for presentation to the second content module 122. The second content module 122 receives the determined location and presents the text content from the received location.

Computer Architecture

Figure 6:
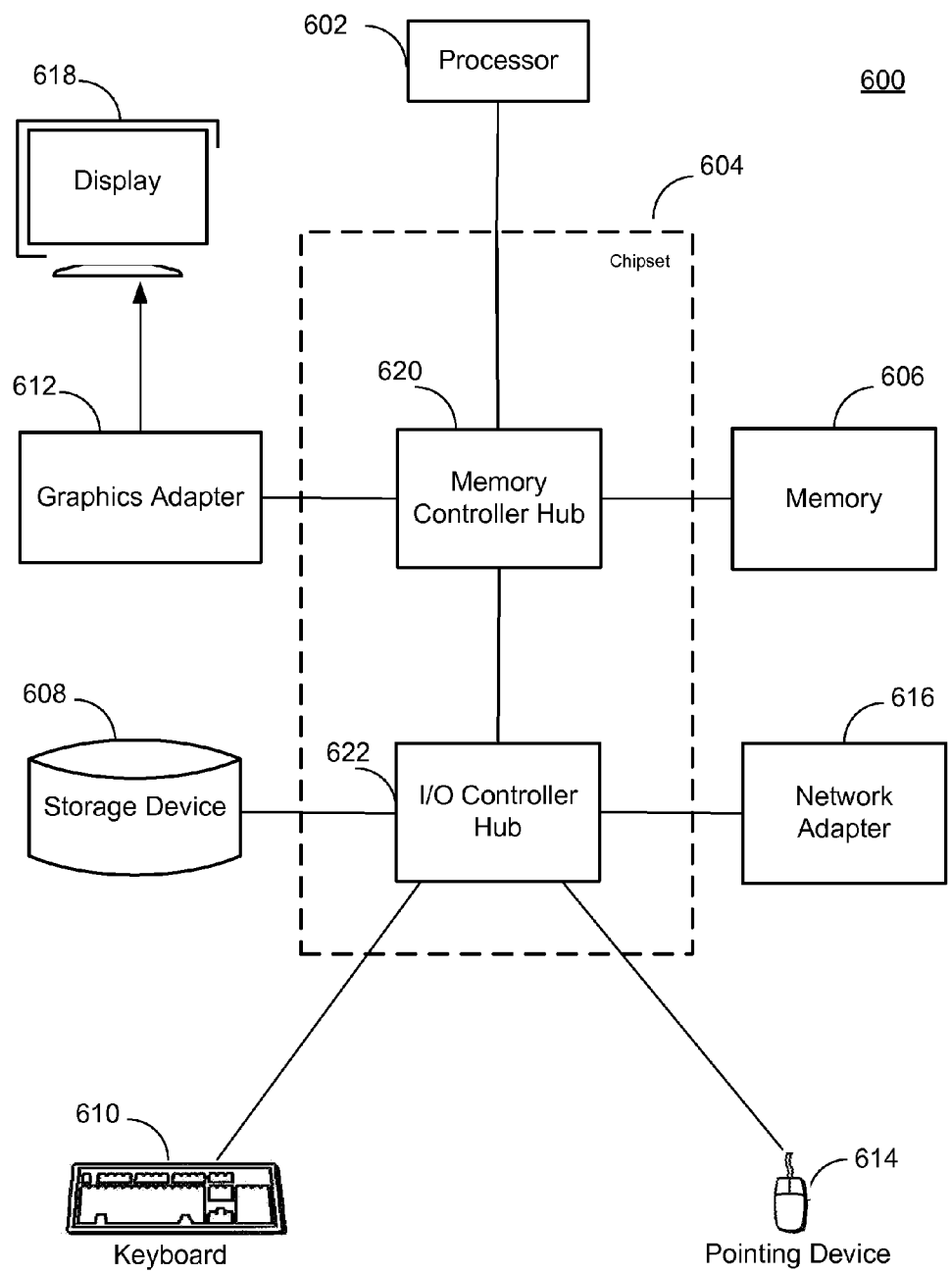
FIG. 6 is a block diagram illustrating an example of a computer for use in the computing environment shown in FIG. 1 according to one embodiment.

The entities shown in FIGS. 1-3 are implemented using one or more computers. FIG. 6 is a high-level block diagram illustrating an example computer 600. The computer 600 includes at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, keyboard 610, pointing device 614, and network adapter 616 are coupled to the I/O controller hub 622. Other embodiments of the computer 600 have different architectures.

The storage device 608 is a non-transitory computer-readable storage medium such as a hard drive, compact disk read-only memory (CD-ROM), DVD, or a solid-state memory device. The memory 606 holds instructions and data processed by the processor 602. The pointing device 614 is a mouse, track ball, or other type of pointing device, and is used in combination with the keyboard 610 to input data into the computer system 600. The graphics adapter 612 displays images and other information on the display 618. The network adapter 616 couples the computer system 600 to one or more computer networks.

The computer 600 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 608, loaded into the memory 606, and executed by the processor 602.

The types of computers 600 used by the entities of FIGS. 1-3 can vary depending upon the embodiment and the processing power required by the entity. For example, the content processing module 112 might comprise multiple blade servers working together to provide the functionality described herein. The computers 600 can lack some of the components described above, such as keyboards 610, graphics adapters 612, and displays 618.

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms and symbolic representations of operations on data bits within a computer memory. These algorithmic descriptions and representations are the means used by those skilled in the art to most effectively convey the substance of their work to others skilled in the art. An algorithm is here, and generally, conceived to be a self-consistent sequence of steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

What is claimed is:

1. A computer-implemented method for switching between synchronized consumption modes of an e-book, the method comprising:

storing a first version and a second version of the e-book, the first version supporting a first consumption mode of the e-book and the second version supporting a second consumption mode of the e-book;

storing signposts associated with the first and second versions of the e-book, the signposts including corresponding locations within the first and the second versions of the e-book;

receiving feedback regarding activity of a plurality of users associated with content in the first version of the e-book;

receiving a current location in the first version of the e-book;

determining a current location in the second version of the e-book based on the stored signposts and the received current location in the first version of the e-book;

adjusting the current location in the second version of the e-book based on the received feedback; and transmitting for presentation the adjusted current location in the second version of the e-book.

2. The computer-implemented method of claim 1, further comprising:

determining locations in the first version of the e-book matching locations in the second version of the e-book; and creating signposts specifying the matching locations in the first and second versions of the e-book.

3. The computer-implemented method of claim 2, wherein the first version is a text version supporting a reading consumption mode of the e-book, and the second version comprises audio content supporting a listening consumption mode of the e-book and determining the matching locations comprises:

converting portions of the audio content from the second version of the e-book into text snippets corresponding to the audio content;

determining a confidence score associated with each text snippet, the confidence score indicating a likelihood that the text snippet was correctly converted from a corresponding audio portion;

identifying text snippets with confidence scores indicating that the text snippets were likely correctly converted; and determining parts of the text version of the e-book that match the text snippets converted from the portions of the audio content from the second version of the e-book with confidence scores indicating that the text snippets were likely correctly converted.

4. The computer-implemented method of claim 1, further comprising:

transmitting a signpost associated with the first and second versions of the e-book to a reviewer for manual verification;

receiving, from the reviewer, an input indicating whether the signpost correctly indicates corresponding locations within the first and second versions of the e-book.

5. The computer-implemented method of claim 1, wherein determining the current location in the second version of the e-book based on the stored signposts and the received current location in the first version of the e-book comprises:

determining a signpost including a location closest to the current location in the first version of the e-book; and determining the current location in the second version of the e-book as the location in the second version specified in the determined signpost.

6. The computer-implemented method of claim 1, wherein determining the current location in the second version of the e-book based on the stored signposts and the received current location in the first version of the e-book comprises:

determining a signpost including a location closest to the current location in the first version of the e-book; and inferring the current location in the second version of the e-book based on the current location in the first version, the determined signpost, and empirical data indicating consumption rates for a typical user for consuming content in the first consumption mode.

7. The computer-implemented method of claim 1, further comprising:

determining a sparsity of the stored signpost responsive to a distance between two consecutive signposts associated with e-book or responsive to a total number of signposts for the e-book;

responsive to a comparison of the sparsity to a threshold, transmitting content from the first version of the e-book and content from the second version of the e-book located between two stored signposts for presentation to a reviewer;

receiving a selection from the reviewer indicating matching locations in the transmitted content from the first version of the e-book and the second version of the e-book; and storing the received matching locations as an additional signpost associated with the first and second versions of the e-book.

8. A non-transitory computer-readable storage medium storing executable computer program instructions for switching between synchronized consumption modes of an e-book, the computer program instructions comprising instructions for:

storing a first version and a second version of the e-book, the first version supporting a first consumption mode of the e-book and the second version supporting a second consumption mode of the e-book;

storing signposts associated with the first and second versions of the e-book, the signposts including corresponding locations within the first and the second versions of the e-book;

receiving feedback regarding activity of a plurality of users associated with content in the first version of the e-book;

receiving a current location in the first version of the e-book;

determining a current location in the second version of the e-book based on the stored signposts and the received current location in the first version of the e-book;

adjusting the current location in the second version of the e-book based on the received feedback; and transmitting for presentation the adjusted current location in the second version of the e-book.

9. The computer-readable storage medium of claim 8, further comprising instructions for:

determining locations in the first version of the e-book matching locations in the second version of the e-book; and creating signposts specifying the matching locations in the first and second versions of the e-book.

10. The computer-readable storage medium of claim 9, wherein the first version is a text version supporting a reading consumption mode of the e-book, and the second version comprises audio content supporting a listening consumption mode of the e-book, and instructions for determining the matching locations comprises:

converting portions of the audio content from the second version of the e-book into text snippets corresponding to the audio content;

determining a confidence score associated with each text snippet, the confidence score indicating a likelihood that the text snippet was correctly converted from a corresponding audio portion;

identifying text snippets with confidence scores indicating that the text snippets were likely correctly converted; and determining parts of the text version of the e-book that match the text snippets converted from the portions of the audio content from the second version of the e-book with confidence scores indicating that the text snippets were likely correctly converted.

11. The computer-readable storage medium of claim 8, further comprising instructions for:

transmitting a signpost associated with the first and second versions of the e-book to a reviewer for manual verification; and receiving, from the reviewer, an input indicating whether the signpost correctly indicates corresponding locations within the first and second versions of the e-book.

12. The computer-readable storage medium of claim 8, wherein determining the current location in the second version of the e-book based on the stored signposts and the received current location in the first version of the e-book comprises:
    determining a signpost including a location closest to the current location in the first version of the e-book; and
    determining the current location in the second version of the e-book as the location in the second version specified in the determined signpost.

13. The computer-readable storage medium of claim 8, wherein determining the current location in the second version of the e-book based on the stored signposts and the received current location in the first version of the e-book comprises:
    determining a signpost including a location closest to the current location in the first version of the e-book; and
    inferring the current location in the second version of the e-book based on the current location in the first version, the determined signpost, and empirical data indicating consumption rates for a typical user for consuming content in the first consumption mode.

14. The computer-readable storage medium of claim 8, further comprising instructions for:
    determining a sparsity of the stored signpost responsive to a distance between two consecutive signposts associated with e-book or responsive to a total number of signposts for the e-book;
    responsive to a comparison of the sparsity to a threshold, transmitting content from the first version of the e-book and content from the second version of the e-book located between two stored signposts for presentation to a reviewer;
    receiving a selection from the reviewer indicating matching locations in the transmitted content from the first version of the e-book and the second version of the e-book; and
    storing the received matching locations as an additional signpost associated with the first and second versions of the e-book.

15. A computer system for switching between synchronized consumption modes of an e-book, the computer system comprising:
    a non-transitory computer-readable storage medium storing executable computer program instructions, the computer program instructions comprising instructions for:
        storing a first version and a second version of the e-book, the first version supporting a first consumption mode of the e-book and the second version supporting a second consumption mode of the e-book;
        storing signposts associated with the first and second versions of the e-book, the signposts including corresponding locations within the first and the second versions of the e-book;
        receiving feedback regarding activity of a plurality of users associated with content in the first version of the e-book;
        receiving a current location in the first version of the e-book;
        determining a current location in the second version of the e-book based on the stored signposts and the received current location in the first version of the e-book;
        adjusting the current location in the second version of the e-book based on the received feedback; and
        transmitting for presentation the adjusted current location in the second version of the e-book; and
    a processor for executing the computer program instructions.

16. The computer system of claim 15, further comprising instructions for:
    determining locations in the first version of the e-book matching locations in the second version of the e-book; and
    creating signposts specifying the matching locations in the first and second versions of the e-book.

17. The computer system of claim 16, wherein the first version is a text version supporting a reading consumption mode of the e-book, and the second version comprises audio content supporting a listening consumption mode of the e-book, and instructions for determining the matching locations comprises:
    converting portions of the audio content from the second version of the e-book into text snippets corresponding to the audio content;
    determining a confidence score associated with each text snippet, the confidence score indicating a likelihood that the text snippet was correctly converted from a corresponding audio portion;
    identifying text snippets with confidence scores indicating that the text snippets were likely correctly converted; and
    determining parts of the text version of the e-book that match the text snippets converted from the portions of the audio content from the second version of the e-book with confidence scores indicating that the text snippets were likely correctly converted.

18. The computer system of claim 15, further comprising instructions for:
    transmitting a signpost associated with the first and second versions of the e-book to a reviewer for manual verification; and
    receiving, from the reviewer, an input indicating whether the signpost correctly indicates corresponding locations within the first and second versions of the e-book.

19. The computer system of claim 15, wherein determining the current location in the second version of the e-book based on the stored signposts and the received current location in the first version of the e-book comprises:
    determining a signpost including a location closest to the current location in the first version of the e-book; and
    determining the current location in the second version of the e-book as the location in the second version specified in the determined signpost.

20. The computer system of claim 15, wherein determining the current location in the second version of the e-book based on the stored signposts and the received current location in the first version of the e-book comprises:
    determining a signpost including a location closest to the current location in the first version of the e-book; and
    inferring the current location in the second version of the e-book based on the current location in the first version, the determined signpost, and empirical data indicating consumption rates for a typical user for consuming content in the first consumption mode.

21. The computer system of claim 15, further comprising instructions for:
    determining a sparsity of the stored signpost responsive to a distance between two consecutive signposts associated with e-book or responsive to a total number of signposts for the e-book;
    responsive to a comparison of the sparsity to a threshold, transmitting content from the first version of the e-book and content from the second version of the e-book located between two stored signposts for presentation to a reviewer;

receiving a selection from the reviewer indicating matching locations in the transmitted content from the first version of the e-book and the second version of the e-book; and storing the received matching locations as an additional signpost associated with the first and second versions of the e-book.

* * * * *